(12) United States Patent
Hepworth et al.

(10) Patent No.: US 7,376,127 B2
(45) Date of Patent: May 20, 2008

(54) METHODS FOR RECONSTRUCTING MISSING PACKETS IN TTY OVER VOICE OVER IP TRANSMISSION

(75) Inventors: Neil Hepworth, Artarmon (AU); Paul Roller Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1084 days.

(21) Appl. No.: 10/437,201

(22) Filed: May 12, 2003

(65) Prior Publication Data

US 2004/0228325 A1  Nov. 18, 2004

(51) Int. Cl.
*H04L 12/66* (2006.01)

(52) U.S. Cl. .................. 370/352; 370/356; 379/52; 379/90.01; 379/93.05; 379/93.08; 379/413.02; 379/413.03; 340/825.19

(58) Field of Classification Search ............. 370/352, 370/356; 379/52, 90.01, 93.05–93.08, 413.02, 379/413.03; 340/825.19
See application file for complete search history.

(56) References Cited

U.S. PATENT DOCUMENTS

| | | | |
|---|---|---|---|
| 6,421,425 B1 | 7/2002 | Bossi et al. | |
| 6,504,910 B1 | 1/2003 | Engelke et al. | |
| 6,603,835 B2 | 8/2003 | Engelke et al. | |
| 6,611,804 B1 * | 8/2003 | Dorbecker et al. | 704/271 |
| 6,625,259 B1 | 9/2003 | Hollatz et al. | |
| 6,842,503 B1 * | 1/2005 | Wildfeuer | 379/52 |
| 6,961,320 B1 | 11/2005 | Swaminathan et al. | |
| 7,027,986 B2 | 4/2006 | Caldwell et al. | |

OTHER PUBLICATIONS

U.S. Appl. No. 10/192,978, filed Jul. 10, 2002, Michaelis.
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
G. Hellstrom et al., "RFC 2793—RTP Payload for Text Conversation," Network Working Group Request for Comments 2793 (May 2000), available at http://www.faqs.org/rfcs/rfc2793.html, 8 pages.

* cited by examiner

*Primary Examiner*—Quynh H. Nguyen
(74) *Attorney, Agent, or Firm*—Sheridan Ross P.C.

(57) ABSTRACT

A system for reconstructing missing packets in a packetized audio TTY stream that includes:
(a) an input 328 operable to receive a plurality of first packets, each comprising one or more TTY tones in a sequence of TTY tones; and
(b) a processor 332 operable to:
(i) order the packets;
(ii) depacketize the TTY tones in the plurality of first packets;
(iii) determine when a TTY tone is missing from the sequence of TTY tones;
(iv) when a TTY tone is missing, perform at least one of the following steps:
(1) determine the a TTY tone based on a portion of the tone contained in an adjacent packet; and
(2) determine the a TTY tone based on one of(i) a random or pseudo-random tone selection, (ii) a comparison of a first probability associated with a first TTY character generated from a first tone substituted for the missing a TTY tone with a second probability associated with a second TTY character generated from a second tone substituted for the missing TTY tone, and/or (iii) a comparison of a first ordering of TTY characters comprising the first TTY character and a second ordering of TTY characters comprising the second TTY character with a library of TTY character orderings.

58 Claims, 5 Drawing Sheets

METHODS FOR RECONSTRUCTING MISSING PACKETS IN TTY OVER VOICE OVER IP TRANSMISSION

CROSS REFERENCE TO RELATED APPLICATIONS

The present application contains subject matter related to the subject matter of copending U.S. application Ser. No. 10/192,978, filed Jul. 10, 2002, entitled "Error Correction Method and Apparatus for TTY on VOIP Transmissions", to Michaelis, which is incorporated herein by this reference.

FIELD OF THE INVENTION

The present invention relates to TTY transmissions. In particular, the present invention relates to the reliable provision of TTY information transmitted using voice over Internet protocol communication networks.

BACKGROUND OF THE INVENTION

To allow for people having speech and/or hearing disabilities that prevent them from using conventional telephones to communicate over the public switched telephony network, text telephones or teletypewriters (TTY devices), also known as telecommunication devices for the deaf (TTD devices) have been developed. In general, such devices encode characters of text using sequences of audible tones. In particular, in response to receiving a command to transmit a character, a TTY device will generate a sequence of audible tones that is transmitted through the telephone network to a similar TTY device at the receiving end. The TTY device at the receiving end decodes the sequence of audible tones, and displays or otherwise outputs the encoded character.

In the United States, TTY devices communicate with one another using a 45.45 baud frequency shift key protocol defined in ANSI/TIA/EIA 825" A 45.45 Baud FSK Modem, commonly referred to as Baudot signaling. Baudot signaling transmits characters using a sequence of seven audible tones at either 1400 Hz or 1800 Hz. As shown in FIG. 1, a Baudot or TTY character 100 comprises a start tone 104 of 1800 Hz, five tones 108-124 of either 1400 or 1800 Hz to signal the series of five bits specifying the character, and a stop tone 128 of 1400 Hz. The stop tone 128 is a border separating this TTY character 100 from the next. Between each adjacent pair of tones, a tone border exists, such as the tone borders 132a-h. To provide both numbers, letters, and punctuation marks, each TTY endpoint operates in two modes, namely a number/figure mode and a letter mode. There is no error correction. At 45.45 baud, the duration of each individual tone is 22 ms, though the stop tone 128 is permitted to be as long as 44 milliseconds. The duration of each TTY character 100 is at least 154 milliseconds, which works out to approximately six and a half characters per second. By coincidence, the duration of individual tones used in Baudot signaling is very close to the time segment of a voice communication that is included in a packet of data transmitted in connection with a typical voice over IP (VoIP) communication system.

Voice over IP or IP telephony is rapidly gaining in popularity due to the widespread availability of the Internet. In IP telephony, voice communications are "packetized" or divided into a number of packets at the source communication device and sent over a packet-switched network, such as the Internet, to the destination communication device. This mechanism permits efficient bandwidth utilization, allowing voice and nonvoice data to be mixed on the same infrastructure. The voice communication is converted into a digital representation for inclusion in packets using either waveform codecs or vocoders. The resulting numerical representation is divided up into frames, a number of which are included within a given packet payload. The payload for each packet is typically 20 milliseconds. Each host packet further includes a header (containing the audio encoding scheme, a packet sequence number, the source and destination addresses and other information), trailer, and other "overhead" bytes.

The ability for each packet to take what is, at that instant, the "best" route to the destination is reason why TTY-on-VoIP is unreliable: because packets are free to take different pathways, they cannot be relied upon to arrive at the receiving device before it is their "turn" to be played. Although these packets often arrive eventually, they are regarded as lost because they did not arrive in time, and must therefore be discarded.

Under most circumstances, the loss of occasional packets is not detectable in voice communication. The reason is that VoIP telephones employ packet loss concealment algorithms that trick the human ear by mimicking the acoustic properties of adjacent packets. Although these techniques work well with voice, they do not work with TTY characters. If a packet containing a TTY tone is lost, the VoIP packet loss concealment techniques of the present art are unable to recover it or rebuild it.

Systems for improving the reliability of TTY transmissions have been developed in other domains, for example in connection with digital wireless telephony applications. In wireless telephony, the problem being addressed was not due to packet loss, but was instead caused by the use of voice-optimized audio encoding techniques that cannot encode TTY tones without distortion. All of these approaches rely on a modem-type mechanism, in which the TTY's Baudot tones are not transmitted as an audio stream, but are instead translated into a non-audio data stream. Despite their inherent reliability, these approaches are not entirely satisfactory because they tend to preclude mixed-mode voice and TTY dialog. This is a significant problem because nearly half of all TTY users are hard of hearing, but still speak clearly. These individuals prefer to receive with their TTYs and then speak in response, something they are unable to do on systems that do not permit TTY and voice transmissions to be intermixed.

The impact of packet loss on the quality on TTY communications can be illustrated by a simple example. Assume a VoIP packet size is 20 milliseconds (a typical value) and the packet loss rate is 0.5% (a rate generally regarded as excellent for VoIP communication). An individual TTY text character 100 is at least 154 milliseconds in length and therefore spans eight packets. When there is a 0.5% likelihood that any one of these packets is missing, approximately 4% of all TTY characters will lose one of their packets. Worse yet, the 4% error rate is deceptively low in that if the lost packet is the one that contains the stop tone 128 for that character, subsequent characters, even if transmitted without packet loss, might nonetheless be decoded improperly. A TTY character error rate of more than 1% is generally regarded as unacceptable, primarily because the transmission of information such as bank balances and credit card numbers becomes unreliable. Using a simple statistical model that is based on a 20 millisecond packet size and ignoring the additional deleterious effects that result from dropping a stop tone 128, the 1% character error rate threshold is exceeded when VoIP packet loss rates exceed approximately 0.12%—a packet loss rate generally regarded as unachievable in standard VoIP systems.

SUMMARY OF THE INVENTION

These and other needs are addressed by the various embodiments and configurations of the present invention. The present invention is directed to an error correction mechanism and system for packetized TTY streams.

In a first embodiment, an error correction process is provided that includes at least the following steps:

(a) receiving a number of first packets, each comprising one or more TTY tones or portions thereof (e.g., start tone, stop tone, and/or character tones) in a sequence of TTY tones;

(b) ordering the packets (typically based on the sequence numbers of the packets);

(c) depacketizing the TTY tones within the first packets;

(d) identifying the "stop tones" within the transmission, thereby permitting the seven-tone sequences that correspond to individual TTY characters to be identified;

(e) determining when a sequence of tones that comprise a TTY character is missing (one or more packet payloads of) audio information (in the simplest case, this would be a gap in the audio transmission, equal in length to the duration of one packet payload, or a gap in the sequence numbers of the received packets);

(f) when a TTY character is determined to be missing one or more packet payloads of audio information, taking advantage of the constrained nature of the TTY protocol (coupled in some embodiments with other sources of information) to build accurate duplicates of the missing packet payloads; and (g) inserting the newly constructed packet payloads into the corresponding gaps in the audio stream.

The steps may be performed by a destination node, such as a communication device, and/or by an intermediate node such as a gateway, a router, a PBX, central office switch, and a proxy server.

The packets are typically part of a Voice-Over-Internet Protocol or VoIP communication.

The reconstructing step may be performed in a number of different ways. For example in one configuration, the audio content of a missing packet is determined based on the tones and the tone borders observed within the adjacent packets that have been received.

In another configuration, which may be more appropriate when clusters of packets are lost, the gaps in the audio stream may be filled with tones at either 1400 Hz or 1800 Hz. The durations of these tones and the locations of intra-tone (adjacent tone) borders would be consistent with the TTY communication protocol. Although each sequence of tones thus created would code for a different TTY character, it is important to recognize that the list of possible characters is constrained because some tones for the intended character were received properly. An enhanced version of this configuration could automatically choose the most likely character from among the possibilities. (Illustratively, if one entire tone within a seven-tone TTY character is missing only two different characters would be possible. When only two choices are possible, a simple automatic process, e.g., one that matches the two spelling possibilities against a list of legal words, can often make an acceptably reliable determination about which character is most likely to be correct.)

An actual implementation of the above configuration would likely require an additional step to be genuinely useful. Given that the same sequence of seven tones can code for a letter or a symbol (e.g., a digit or punctuation), it would be desirable for an automatic correction mechanism to take into account the TTY transmission mode so the algorithm knows what rules to apply. (Illustratively, the tonal sequence 00001 corresponds to the letter E when a TTY is in letters mode and to the digit 3 when the TTY is in numbers/figures mode.) For example, the system might insert its best guess when in letters mode but insert a "safe character" or unknown identifier, such as a question mark when digits are being transmitted. In this manner, the recipient will be alerted when there has been a transmission failure and can ask the sender to retransmit the missing information. (In other words, a safety net is being provided to overcome one of the deficiencies associated with half-duplex TTY communication.)

The method can have a number of advantages compared to conventional TTY VoIP architectures. For example, the present invention can allow for Baudot characters to be transmitted across VoIP networks with greater reliability when typical levels of packet loss are being experienced. The present invention, unlike conventional approaches that require translation into an error-correcting IP text protocol such as RFC 2833 and ITU T.140, can retain the rapid point-to-point transmissions associated with traditional VoIP systems, while allowing the easy intermixing of (non-TTY) voice and TTY traffic on the same call, which is a very important consideration for single-channel call paths, e.g., those that include the PSTN. The present invention differs from traditional voice-optimized VoIP packet loss concealment algorithms because it leverages an underlying knowledge of the TTY communication protocol to reconstruct missing VoIP packets. If any of the packets are lost or otherwise missing, for example, the missing information can be recovered by copying audio information in the received adjacent packet into the empty time slot. Accordingly, redundancy is provided, lessening the chance that a character will be lost. The present invention thus makes it possible to comply with appropriate disability access regulations and statutes, such as those promulgated by the FCC under Section 255 of the Telecommunications Act of 1996 and Federal Procurement Regulations under Section 508 of the Workforce Investment Act of 1998. Because the destination and not the sender node detects errors and effects packet reconstruction, the source node can be conventional such that both the source and destination nodes do not require upgrading to implement the present invention. The present invention can operate effectively on standard packet lengths, such as 10 ms, 20 ms, and even 30 ms.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2:
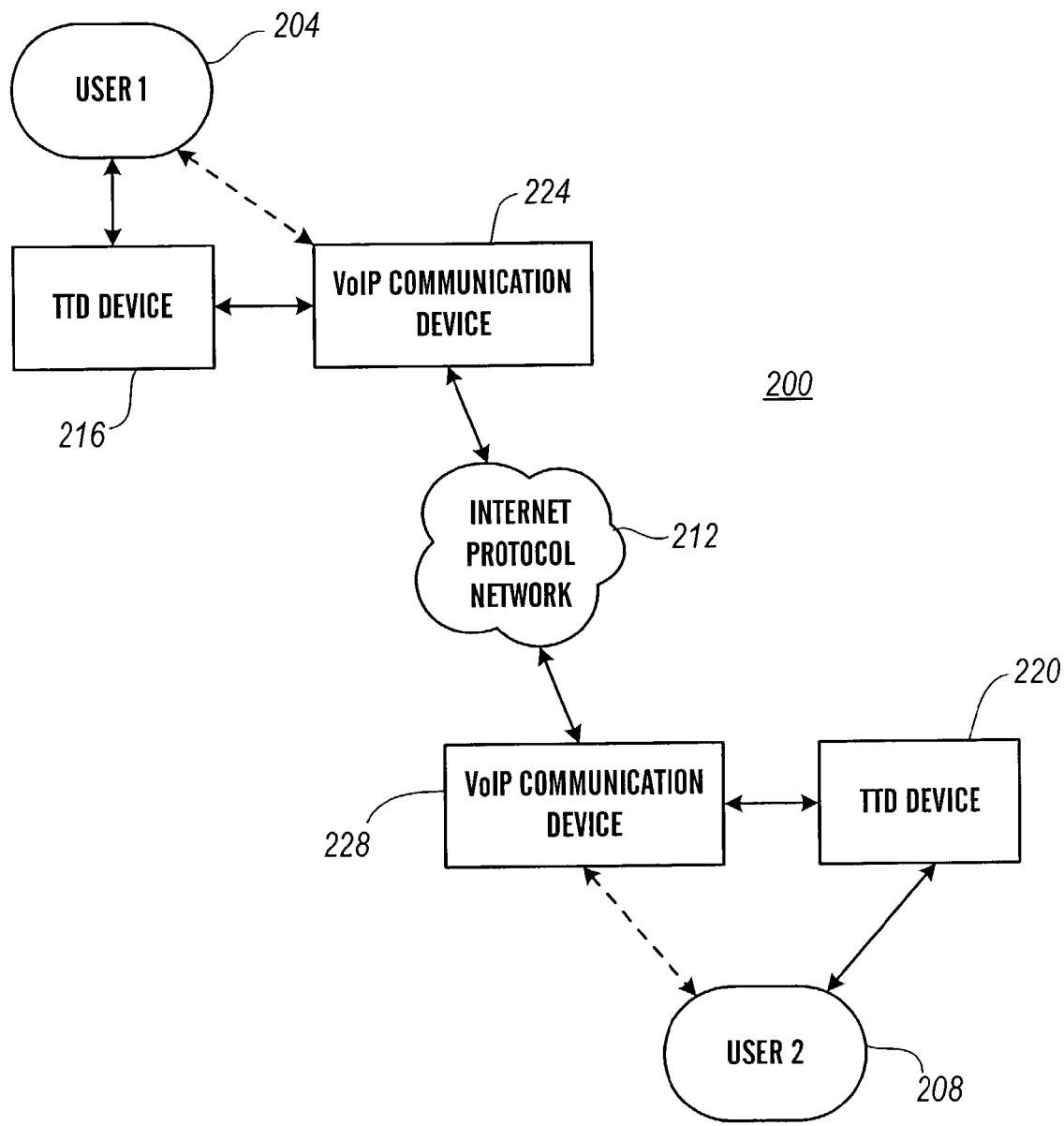
FIG. 2 is a block diagram depicting a system including a voice over Internet protocol network interconnected to TTD devices in accordance with an embodiment of the present invention.

In a typical arrangement such as shown in FIG. 2, a TTD device 216, 220 is coupled to a communication device, including a VoIP communication device 224, 228, by an acoustical or an electronic coupler. In an acoustical coupler arrangement, the TTD device 216 provides a mechanical coupler that receives the speaker portion of a handset associated with the communication device 224, 228 at a receiver portion of the coupler, and receives the microphone portion of the handset associated with the communication device 224, 228 at an output portion of the coupler. Such couplers often include flexible bellows arrangements, to improve the efficiency with which audible signals are transferred between the handset and the TTD device 216, 220. In such arrangements, signals encoding characters are transmitted or received as audible analog data. In an electronic coupler arrangement, the TTD device 216, 220 passes analog or digital electronic representations of the audible tones comprising a textual character to the communication device 224, 228. Furthermore, in a typical arrangement, the VoIP communication device 224, 228 performs the necessary encoding and packetizing of the audible information for transmission across the Internet protocol network 212. Similarly, the VoIP communication device 224, 228 at the receiving end typically unpacketizes and decodes the audible data.

Figure 3:
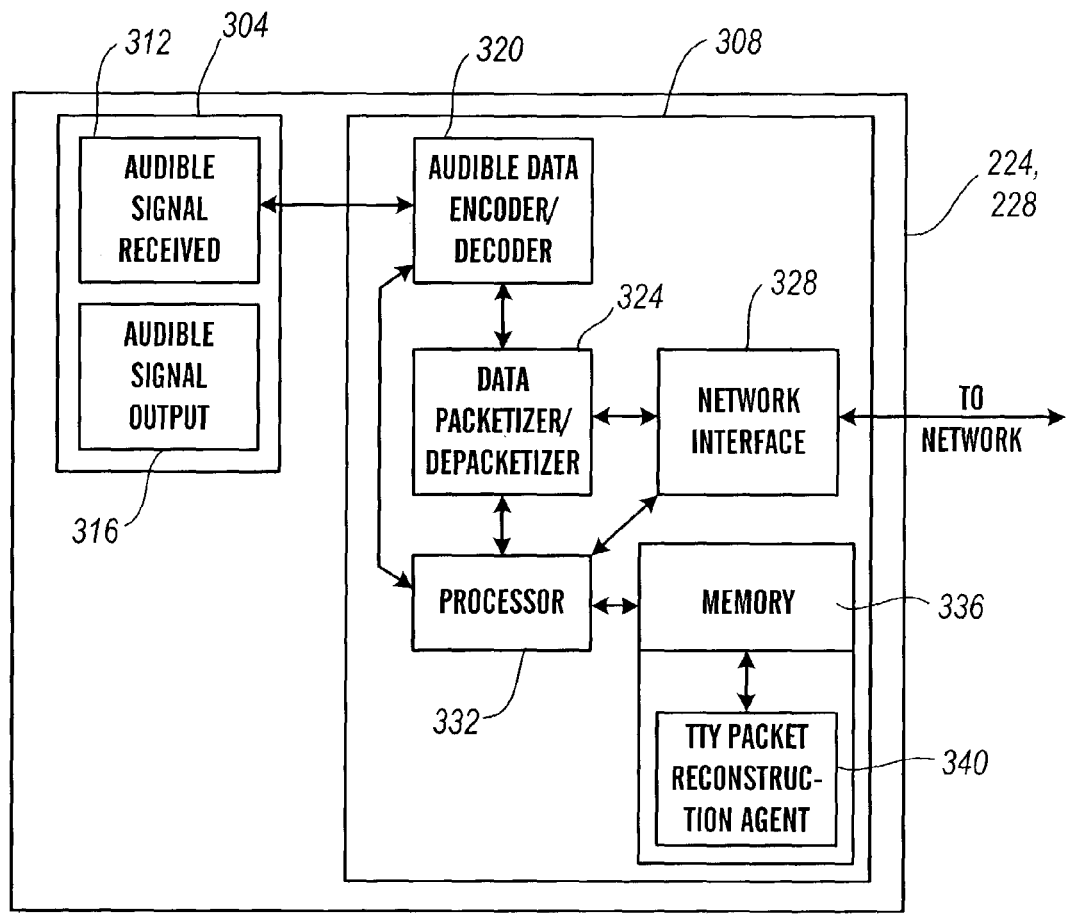
FIG. 3 is a block diagram depicting a VoIP communication device in accordance with an embodiment of the present invention.

With reference now to FIG. 3, a block diagram depicting a VoIP communication device 224, 228 in accordance with an embodiment of the present invention is illustrated. In general, the VoIP communication device 224, 228 comprises a handset or headset portion 304 and a base portion 308. The handset portion 304 generally includes an audible signal receiver 312 and an audible signal output 316. As can be appreciated, instead of or in addition to being included as part of a telephone handset 304, an audible signal receiver 312 and an audible signal output 316 may be provided as part of the base (e.g., base 308) for example when a VoIP communication device 224, 228 provides and is used as a speaker phone.

The base 308 generally includes the hardware and software, microcode, and/or firmware required to convert audible signal information between analog electronic signals received by the audible signal receiver 312 and provided by the audible signal output 316, and packet data transmitted across the Internet protocol network 212. Accordingly, the base unit 308 may include an audible data encoder/decoder 320 for digitizing an analog electronic representation of an audible signal received by the audible signal receiver 312. In addition, the audible data encoder/decoder 320 may create an analog electronic output for provision to the audible signal output 316 in response to the receipt of a digital representation of such data. The base 308 of the VoIP communication device 224, 228 additionally includes a data packetizer/depacketizer 324. The data packetizer/depacketizer creates packets of digitized audible data received from the audible data encoder/decoder 320. In particular, packets containing data encoding segments of an audible signal are created. In addition, the data packetizer/depacketizer 324 receives packets containing digital representations of audible signals and provides that digital data to the audible data encoder/decoder 320.

The network interface 328 serves to interconnect the VoIP communication device 224, 228 to the Internet protocol network 212. Accordingly, the network interface 328 comprises the physical link between the VoIP communication device 224, 228 and the Internet protocol network 212.

The VoIP communication device 224, 228 initially may include a processor 332 and memory 336. In general, the processor 332 may control the functions of the other components of the VoIP communication device 224, 228, such as the audible data encoder/decoder 320, the data packetizer/depacketizer 324 and the network interface 328. In addition, the processor 332 may store data or run application programs stored on the memory 336, such as TTY packet reconstruction agent 340. In a further aspect, the processor 332 may implement the functions of, for example, the audible data encoder/decoder 320 and/or the data packetizer/depacketizer 324. Accordingly, the processor 332 may comprise, for example, a general purpose programmable processor, ASIC, or DSP. The memory 336 may comprise any computer data storage device, such as solid state memory, a hard disk drive, or read only memory. As can be appreciated, the processor 332 and memory 336 may also be implemented as a single controller type device.

Figure 4:
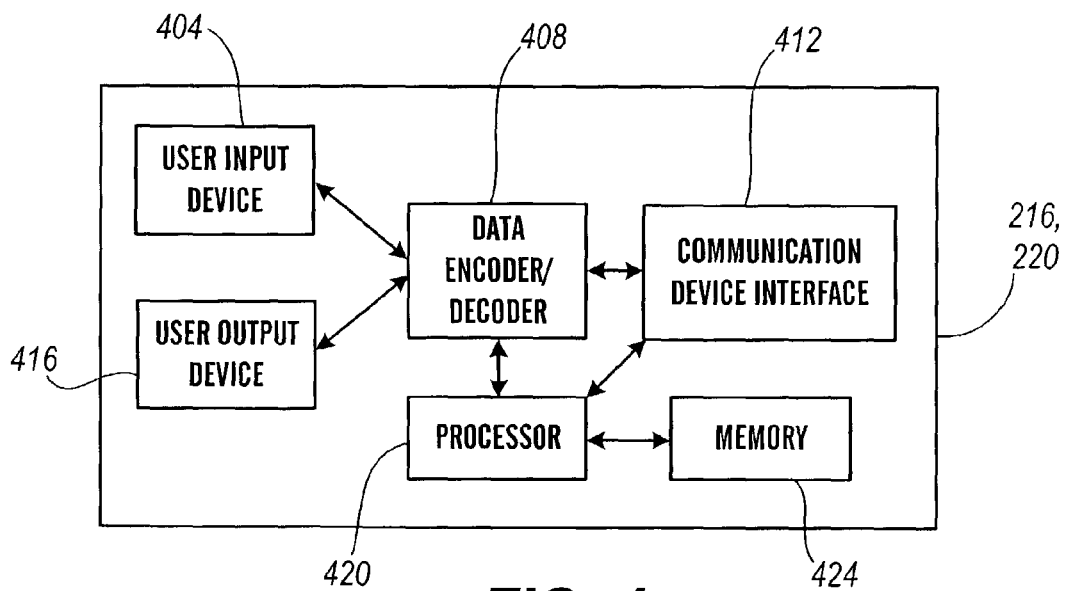
FIG. 4 is a block diagram depicting a TTD device in accordance with an embodiment of the present invention.

With reference now to FIG. 4, a TTD device 216, 220 in accordance with an embodiment of the present invention is illustrated. In general, the TTD device 216, 220 includes a user input device 404. For example, the user input device 404 may comprise a keyboard that allows a user to input characters directly. The user input device 404 transforms the user's selection of a character into an electronic signal that is provided to a data encoder/decoder 408. The data encoder/decoder 408 encodes the selected character as a sequence of audible tones. For example, a TTD device 216, 220 adhering to the standards for such devices in widespread use in the United States in connection with wireline devices interconnected to the public switched telephony network might use Baudot signaling. In Baudot signaling, each character comprises a start bit consisting of an 1800 Hz tone, five tones of either 1400 or 1800 Hz specifying the character, and a 1400 Hz tone as a stop bit. The output from the data encoder/decoder 408 is provided to a communication device interface 412.

The communication device interface 412 generally provides an interface between the TTD device 216, 220 and the associated VoIP communication device 224, 228. Accordingly, the communication device interface 412 may comprise an acoustic coupler. Alternatively, the communication device interface 412 may provide a wireline connection to the VoIP communication device 224, 228. When implemented as a wireline connection, the communication device interface 412 may additionally encode the audible signal information received from the data encoder/decoder 408 as required by the particular VoIP communication device 224, 228. Additionally, it should be appreciated that the communication device interface 412 may provide both an acoustic coupler type interface and an electronic interface.

The TTD device 216, 220 also typically includes a user output device 416. For example, the TTD device 216, 220 may provide a display capable of displaying one or more lines of text to the user. Alternatively or in addition, the user output device 416 may comprise a printer or other device capable of creating a hard copy representation of characters. In general, the user output device 416 receives commands regarding characters to be displayed and/or output from the data encoder/decoder 408. The characters output by the user output device 416 are generally those characters received from another TTD device (e.g., TTD device 220) in communication with the first TTD device (e.g., TTD device 216). In addition, the user output device 416 may output characters entered by the user at that TTD device (e.g., first TTD device 216) in connection with the user input device 404, as confirmation of the user's input.

The TTD device 216, 220 may additionally include a processor 420 and memory 424. The processor 420 is generally capable of controlling and/or implementing the functions associated with the TTD device 216, 220. For example, the processor 420 may implement or control the functions of the data encoder/decoder 408. The memory 424 may generally provide data storage space. In addition or alternatively, the memory 424 may store programs that allow the processor 420 to perform its functions. The processor 420 may comprise, for example, a general purpose programmable processor, ASIC, or DSP. The memory 424 may be any memory suitable for the storage of computer data, including solid state memory such as RAM or ROM. As can further be appreciated, the processor 420 and memory 424 may be implemented as part of a controller.

As will be appreciated, the depicted architecture may be varied in innumerable ways and is not intended to be limiting. For example, the Internet Protocol Network 212 can be a packet switched network employing one or more other protocols, such as the Ethernet protocol.

The transmission of a textual character in accordance with an embodiment of the present invention will now be discussed. Initially, user input comprising the selection of a textual character by the user (e.g., the first user 204) is received. For example, in the present invention, the first user 204 may select the letter "E" by pushing a key provided as part of the user input device 404 of the first TTD device 216. A first tone in the sequence of audible tones representing the input character is generated. In the present example, the first tone in the sequence of audible tones representing the selected character "E" is a 22 ms tone having a frequency of 1800 Hz representing the start bit. In general, this tone is generated by the data encoder/decoder 408 and provided to the first VoIP communication device 224 by the communication device interface 412.

The tone is received from the communication device interface 412 by the first VoIP communication device 224, for example by the audible signal receiver 312. A first packet of data encoding all or a portion of the received tone is created. In particular, the audible data encoder/decoder 320 receives the tone (and any subsequent tones in the audiostream) from the audible signal receiver 312, and passes an electronic (digital) representation of the tone(s) to the data packetizer/depacketizer 324. Additional packets of data encoding the remaining portion of the tone and subsequent tones defining the TTY character are created.

The packets are then provided to the Internet protocol (IP) network. Thus, in the present example, the data packets are passed from the data packetizer/depacketizer 324 to the network interface 328 for transmission over the Internet protocol network 212. In a typical implementation, the packets are transmitted serially, with the first packet transmitted first, and the second packet second. As can be appreciated, in an embodiment of the present invention, the first packet of data can be provided to the Internet protocol network 212 as the next data packet is being created.

The process is repeated in connection with a next TTY character (or sequence of tones) input by the user.

The reception of packet data encoding a TTY character will now be discussed. Initially, a full or partial set of data packets encoding a sequence of tones or containing audio information is received from the Internet protocol network 212. The packets are ordered according to the relative position of the data encoded by the packets within the sequence of tones (or the audio stream). Because of differential routing, packets of data are often received at the network interface of the receiving VoIP communication device (e.g., second VoIP communication device 228) in an order that does not correspond to the order of the encoded data or audio information. Generally, the step of ordering the packets is performed after some interval of time, to allow for varying times of arrival, and is done based on the sequence number in the received packet headers. However, to ensure a natural flow to communications, a limit is placed on the amount of time allowed for packets to arrive before they are considered dropped. For example, about 150 ms may be allowed for a packet to arrive.

Figure 5:
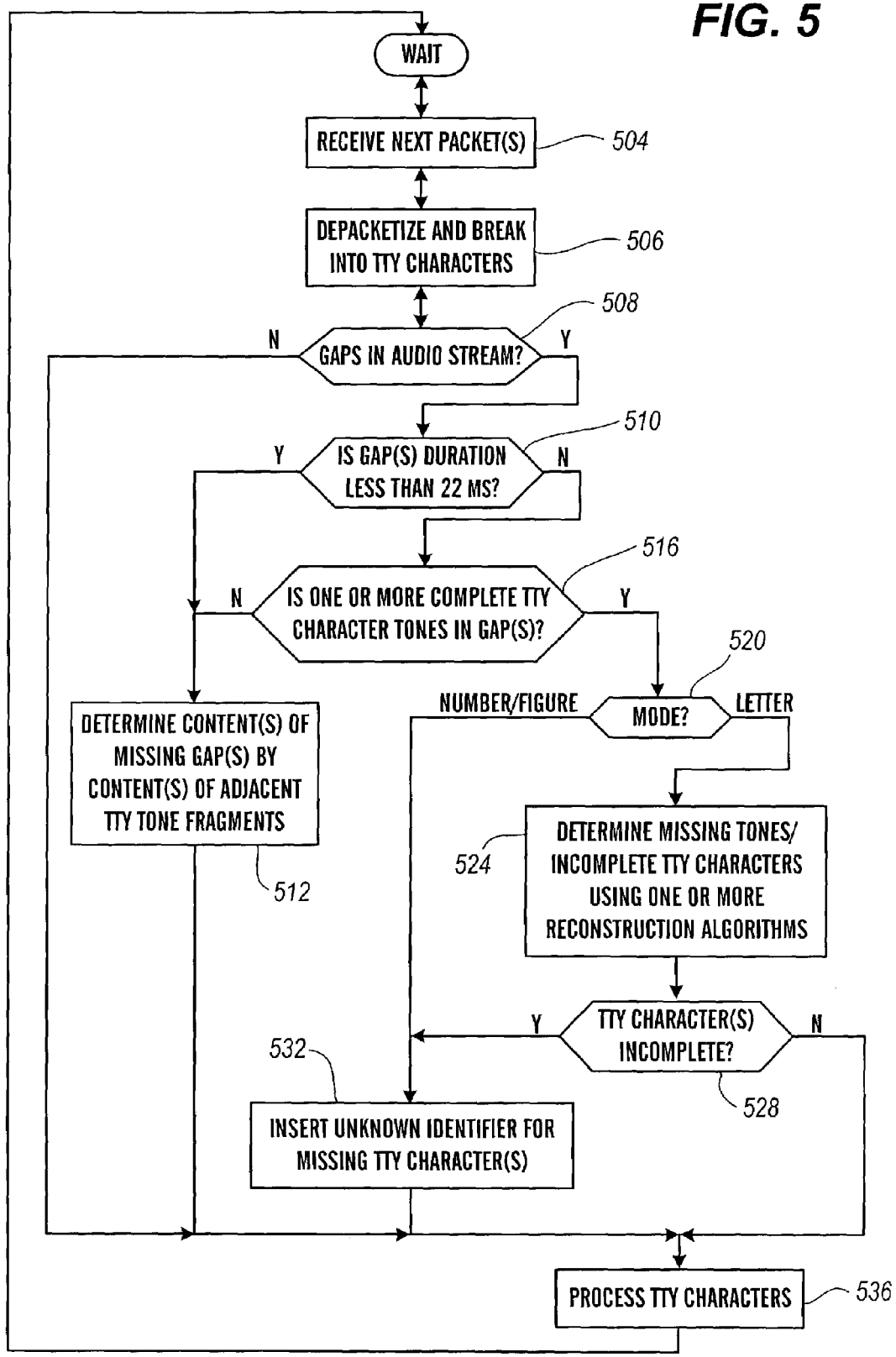
FIG. 5 is a flow chart depicting an exemplary embodiment of the operation of the TTY packet reconstruction agent.

When the time limit is satisfied, the temporally ordered packets are processed as shown in FIG. 5. The packets for which the time limit is satisfied are first passed to the packetizer/depacketizer 324. In step 506, the packetizer/depacketizer depacketizes the ordered packets and provides the temporally ordered or synchronized depacketized audio information to the TTY packet loss reconstruction agent 340.

Also in step 506, the agent 340 breaks the synchronized audio information in the depacketized packet payloads into TTY characters. This is effected by determining the locations of tone borders (between adjacent tones) based on the previously received TTY character stream or the start and/or stop tones. As noted above, the duration of each TTY character tone and the start tone is 22 ms while that of the stop tone is typically 33 ms. This information permits the locations of the tone borders in the TTY character to be determined. Using the packet (temporal) sequencing information contained in the packet headers and the duration of the packet payload, the appropriate tone or audio information in the ordered depacketized packet payloads is copied into the pertinent tonal slot or portion thereof. "Audio information" or "tone information" is commonly an encoded, digitized audio stream, such as an audio stream encoded by the G.711 algorithm. For example, if a packet contains 8 ms of a first tone and 12 ms of the next tone, the 8 ms of the first tone is copied into the appropriate portion of a first tonal slot and the 12 ms of the second tone into the appropriate portion of the next tonal slot.

Slightly more sophisticated analysis may be required to locate start tones and stop tones and maintain correct packet synchronization. If a first packet was 20 ms in duration at 1400 Hz, the preceding and succeeding packets would be examined to determine where to place the tone border in the missing packet. Accommodation of stop tones can be handled by knowing that every seventh tone is longer in length than 22 ms and therefore must be 1400 Hz. As will be appreciated even when a gap duration is equal to or greater than 22 ms due to the use of a 30 ms packet payload duration or the loss of two or more adjacent packets, the gap may include a stop tone, which has a duration of 33 ms, or correspond to a start tone, which may be ascertained based on the synchronization of the tone sequence and the proper locations of the tone borders.

In decision diamond 508, a determination is made as to whether there are any gaps in the audio stream, e.g., whether any tonal slots are entirely or partially incomplete. This determination is enhanced by the prior step of breaking or partitioning the audio information or audio stream into TTY characters. When there are no gaps in the audio stream, the agent proceeds to step 536 discussed below. When there are gaps in the audio stream, the agent proceeds to decision diamond 510.

In decision diamond 510, the agent determines whether the gap(s) have a duration of less than 22 ms, or the shortest length of a tone in the audio sequence. This will typically be the case where only one packet in any three sequential packets is lost and the packet payload duration is 22 ms or less.

Figure 7:
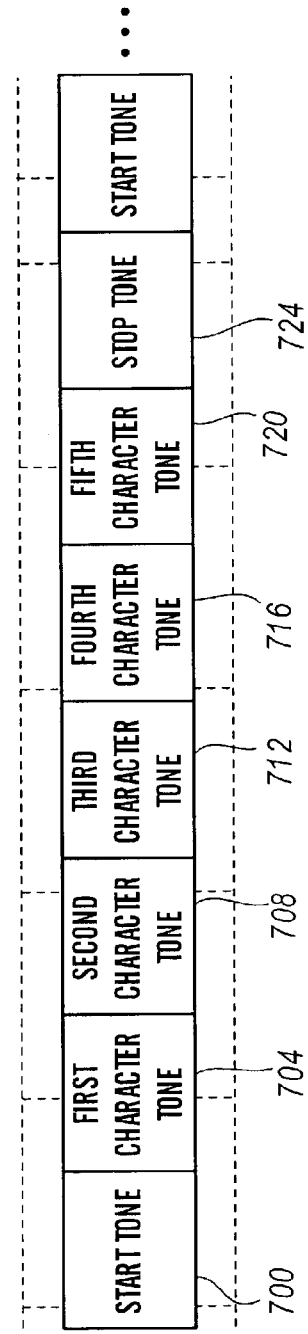
FIG. 7 is a second example of TTY character reconstruction.
Figure 8:
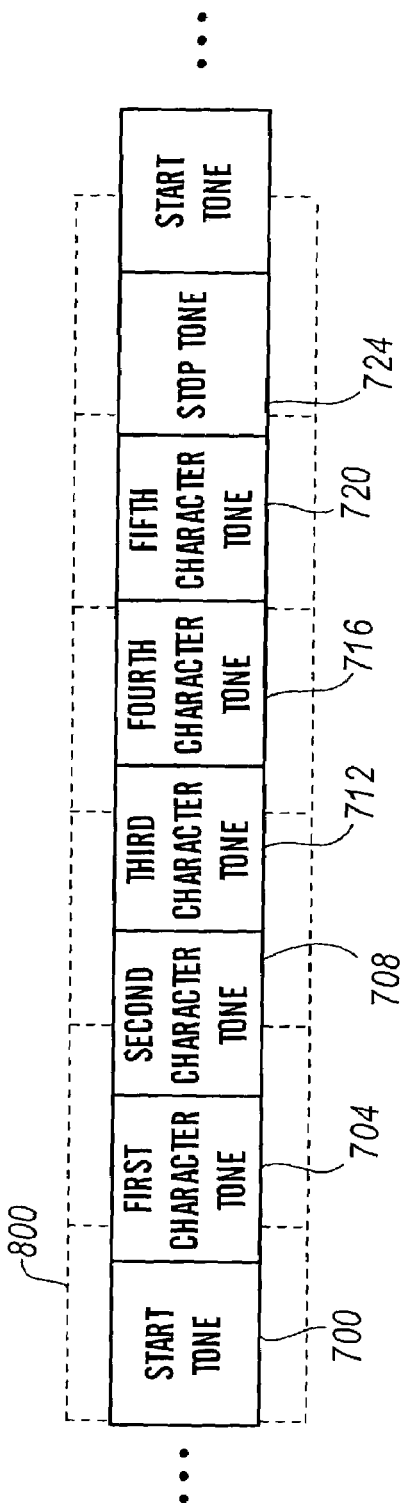
FIG. 8 is a third example of TTY character reconstruction.
Figure 9:
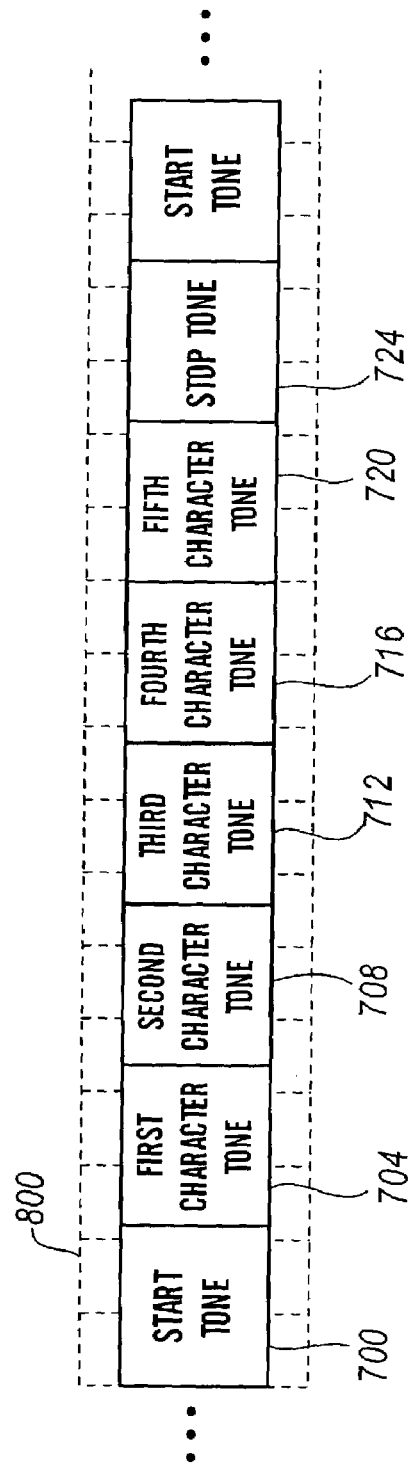
FIG. 9 is a fourth example of TTY character reconstruction.

Using standard packet payload lengths, the possible sizes of the gaps for a single packet loss are illustrated in FIGS. 7-9. As can be seen from these figures, packet lengths can vary, with 10 ms, 20 ms, and 30 ms being most common. As will be appreciated, the packet length is selected typically based on desired levels of packet overhead and available bandwidth. In each of FIGS. 7-9, the start tone 700 is 1800 Hz, the first, second, and fourth character tones 702, 708, and 716 are each 1400 Hz, the third and fifth character tones 716 and 720 are each 1800 Hz, and the stop tone 724 is 1400 Hz. The durations of the start tone and first through fifth character tones are each 22 ms. The duration of the stop tone is longer than 22 ms (preferably either 33 or 44 ms). The dashed lines represent individual packet payloads and illustrate what portion of each tone is in each packet. As shown in. FIGS. 7 (which shows a 20 ms packet length) and 9 (which shows a 10 ms packet length), it will always be the case for a 10 or 20 ms packet that a TTY character tone will span at least two adjacent packets because the duration of the packet is less than the shortest duration of the character tones (i.e., 22 ms). This, however, may not be the case for a 30 ms packet length as shown by FIG. 8. As can be seen from FIG. 8, the first packet 800 includes the entirety of the start tone 700 and part of the first character tone 704. Accordingly, for a gap having a duration of less than 22 ms (which means that the packet payload duration is either 10 or 20 ms), a fragment of the missing tone(s) will be located in adjacent correctly received packet payloads or in adjacent portions of the tone slots but for a gap having a duration of 22 ms or more (which means that the packet payload duration is 30 ms and/or that two or more adjacent packets are missing), a fragment of the missing tone(s) may not be located in adjacent correctly received packet payloads or in adjacent portions of the tone slots.

Returning to decision diamond 510 when the gap duration(s) is less than 22 ms, the agent proceeds to step 512 discussed below. When the gap duration(s) is equal to or greater than 22 ms, the agent proceeds to decision diamond 516.

In decision diamond 516, the agent determines whether one or more complete TTY character tones are in the gap(s). When one or more complete TTY character tones are not in the gap(s), the agent proceeds to step 512. In step 512, the agent determines the tonal content(s) of the gap(s) based on the content(s) of adjacent tone fragments.

Figure 1:
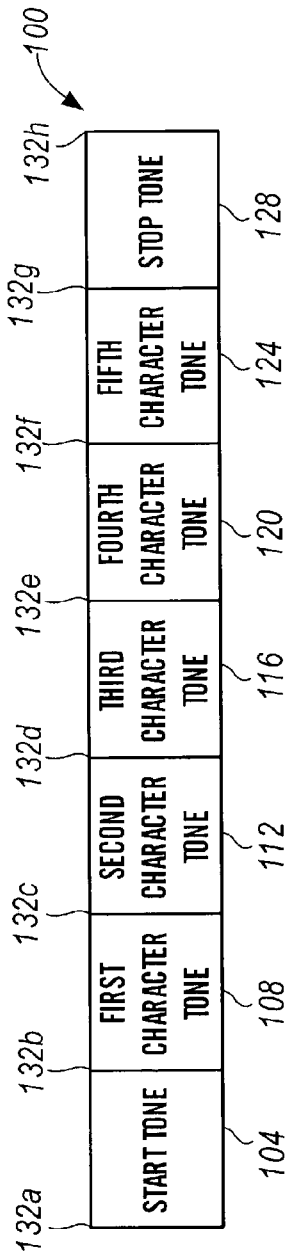
FIG. 1 is a depiction of a prior art TTY character structure.
Figure 6:
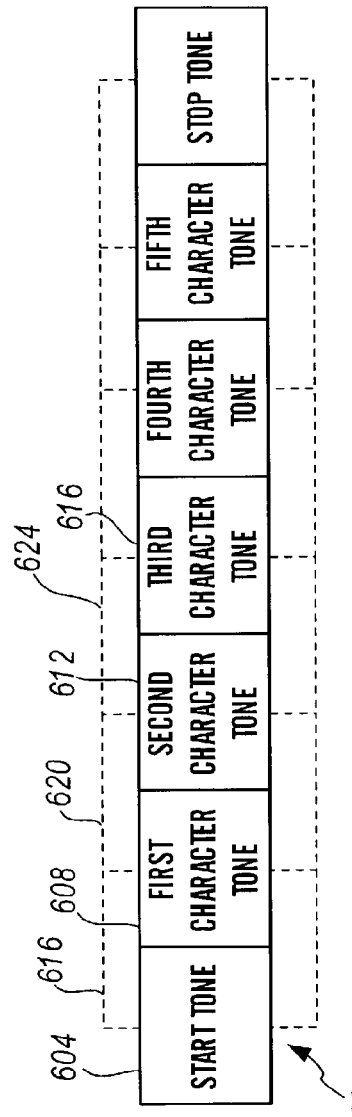
FIG. 6 is a first example of TTY character reconstruction.

An example will now be discussed to demonstrate packet reconstruction in step 512 using the contents or frames in other, typically adjacent, packets. Referring to FIG. 6, a complete TTY character 600 is depicted. The start tone 604 in the first tone slot has a frequency of 1800 Hz; the first character tone 608 in the second tone slot a frequency of 1400 Hz, and a second character tone 612 in the third tone slot a frequency of 1800 Hz. The dashed lines represent the packets into which the tones are placed. Thus, assuming a 20 ms packet duration a first packet 616 includes 10 ms of the start tone 604 and 10 ms of the first character tone 608. A second packet 620 includes 12 ms of the first character tone 608 and 8 ms of the second character tone 612. A third packet 624 includes 14 ms of the second character tone 612 and 6 ms of the third character tone 616. If the second packet 620 is lost, it is known that the last 10 ms of the first packet 616 payload in the first portion of the second tone slot 608 has the same frequency as the missing second portion of the second tone slot 608 corresponding to the first portion of the missing second packet 620 and that the first 8 ms of the third packet 624 payload in the second portion of the third tone slot 612 has the same frequency as the missing first portion of the third tone slot 612 corresponding to the second portion of the missing second packet 620. Accordingly, the frequency of 1400 Hz in the last 10 ms of the first packet 616 is copied into the last 12 ms of the second tone slot 608 and the frequency of 1800 Hz in the first 14 ms of the third packet 624 is copied into the first 8 ms of the third tone slot 612.

Returning to decision diamond 516 when one or more complete TTY character tones are in the gap(s), the agent proceeds to decision diamond 520 and determines whether the TTD device was in letter or number/figure mode when the TTY character was generated. This determination is important because certain reconstruction algorithms employed in step 524 are most applicable to words and not numbers and certain numeric sequences, such as telephone numbers and credit card numbers, are too important for a number to be guessed.

When the TTD was in letter mode, the agent 340 in step 524 can employ any one or more of a number of differing reconstruction algorithms.

The simplest algorithm is to randomly or pseudo-randomly select either 1400 Hz or 1800 Hz as the frequency value for the missing tone(s). A random selection approach would have a 50% likelihood of being correct. It also has a 50% chance of being wrong, which can present a problem if it occurs in the midst of important information, such as an address or medical or emergency information.

Another algorithm is based on probability. It is known that certain letters occur more frequently in normal use than others. A probability could be assigned to each letter in the alphabet and a selection made for the missing character tone based on the letter alternative having the highest associated probability. For example, if a first character tone is missing and the remaining character tones have the sequence "0001", "e" and "z" are the two possible letters. As will be appreciated, there is a higher likelihood that "e" was used rather than "z". Accordingly, the letter "e" would be selected as the correct TTY character.

A spell checking program may be able to determine accurately the value of the missing character tone. When one bit or character tone in a TTY sequence is unknown, only two different characters are possible. A spell checker program should be able to look at the entire word and select which of the two alternative letters is most likely to be correct. This is typically done by comparing the two different words (or phrases) based on the two alternative letters with a library of words (and/or phrases) to identify a match. The alternative having a match is assumed to be the correct alternative. If two matches are found, an unknown identifier discussed below with reference to step 532 may be employed for the TTY character. The library may be user configurable or dynamically updated during use to reflect the words (or phrases) used/received by the user. For example, if the TTD device was in letter mode and one character tone is missing from the sequence of tones defining the TTY character, the two possible letters can be generated from the two possible frequencies for the missing tone. The letters in the word are determined by locating spaces in the TTY character stream and/or punctuation marks, such as a period, comma, question mark, exclamation mark, hyphen, quotation mark, apostrophe, colon, and the like.

The spell checker can, however, introduce significant delay into real-time communications. An entire word would commonly need to be received and buffered, a spell check analysis performed to determine the missing TTY character, and the corrected word displayed on the recipient's TTD device. It may be necessary to buffer several TTY characters without any prospect of "catching up" with the transmitting TTD device. This can cause significant point-to-point transmission latencies. Nonetheless, this algorithm may be useful in applications such as messaging.

In applications requiring immediate missing TTY character assessment, it may be desirable not to use a spell checker but rather to use the random or pseudo random approach, the letter usage probability approach, and/or the unknown identifier. Alternatively, the spell checker can be modified to effect instantaneous assessment as TTY characters are received. As will be appreciated and as noted above, a spell checker algorithm normally waits for the entire word to be received. The spell checker, for example, can be used to recognize letter groupings that are not possible in normal linguistic usage and/or that have a very low likelihood of being used. By way of illustration, when a TTY character is missing due to the loss of the first character tone and there are two-possible letter groupings "eee" and "eze", the spell checker can recognize readily and quickly that the correct letter sequence is likely "eze".

After completion of step 524, the agent 340 in decision diamond 528 determines whether any TTY character(s) are still incomplete. If not, the agent proceeds to step 536 discussed below. If so or in the event that the TTD device was in number mode in decision diamond 516, the agent proceeds to step 532.

In step 532, the agent inserts an unknown identifier for the missing TTY character(s). The unknown identifier is any numeric, alphanumeric, or alphabetical symbol that denotes an unknown TTY character. For example, the identifier can be an underscored space, a geometric shape such as a question mark. The recipient, if unable to ascertain the incomplete word or number from the identifier and surrounding letters/numbers, could request the sender to retransmit the incomplete word or number.

Finally, in step 536, the complete sequence of audible tones contained in the set of data packets is processed. As can be appreciated, the audible signal may be provided directly to the user from the audible data encoder/decoder 320 and the audible signal output 316 where the communication device interface 412 of the receiving TTD device (e.g., second TTD device 220) comprises an electronic coupler. For example, the receiving TTD device (e.g., second TTD device 220) may output the signaled character to the user through the user output device 416.

With regard to the accuracy improvement one might expect, the best results using the above algorithm will occur when loss is not bursty. Specifically, if the packet loss is purely random the possibility of losing two adjacent packets will be the packet loss rate squared, e.g., for a 5% packet loss rate, the likelihood of any two adjacent packets being lost is 0.25%. Bursty loss, however, has a much higher likelihood of causing two or more adjacent packets to be lost.

As can be appreciated from the foregoing description, the present invention provides for the reliable transmission of TTY data over VoIP communication networks. In particular, the present invention permits TTY characters to be accurately transmitted even when a packet of data comprising a portion of a tone used to encode a character is dropped during transmission of the data across a packet data network. Furthermore, it should be appreciated that the present invention is not limited to use in connection with the TTY standard prevalent in the United States. For example, the present invention may be adapted to the TTY protocol used in the United Kingdom, Ireland, Australia, and South Africa by modifying the above algorithms to reflect a minimum tone duration of 20 ms instead of 22 ms.

In addition, it should be appreciated that the present invention allows for the convenient transmission of textual data using, for example, Baudot code, and voice data in a single communication session. For example, communications from a first user to a second user may use transmitted text, while communications from the second user to the first may be by voice. Accordingly, transmitted text may be used only to the extent that it is required by the parties to a communication session.

A number of variations and modifications of the invention can be used. It would be possible to provide for some features of the invention without providing others.

For example in one alternative embodiment, the TTY packet reconstruction agent can be located in an intermediate node in addition to or in lieu of the source and/or destination nodes. For example, TTY packet reconstruction agents can be included in, for example, port cards of intermediate nodes, such as routers, proxy servers, PBX systems, central office switches, VoIP gateways, and systems that translate automatically between TTY and voice or between TTY and other text protocols such as "Instant Messaging". When used in an intermediate node, the flowchart of FIG. 5 is unchanged. In the processing step 536, however, the TTY characters are forwarded to a data packetizer/depacketizer which reforms the TTY characters into packets having appropriate headers, trailers and overhead bytes. The reformed packets are then transmitted to the next intermediate node or the destination node. Such intermediate node error correction can reduce substantially the effects of bursty packet loss and error propagation on TTY character reconstruction at the destination node. It is also beneficial where the codec employed at different intermediate nodes changes as repacketizing is normally done as a part of the codec change.

In another alternative embodiment, an approach similar to the spell checker is also used in the number mode. A library of numeric codes, such as an address or telephone number directory, can be compared to the two different numeric sequences based on the two possible tones for the missing character tone. A match is assumed to be the correct number.

In another alternative embodiment, the present invention is used not only for real-time but also for non-real-time contacts. Real-time contacts are typically person-to-person conversations while the non-real-time voice contacts would be situations in which minor time delays would be acceptable, such as interactions with TTY-enabled voice mail, automated attendant, and IVR systems include voice mail, and the like.

In yet another alternative embodiment, the packet length is selected by the packetizer/depacketizer to be less than the minimum tone duration in a TTY character. Preferably, the packet length is selected to be one-half or less of the length of the minimum tone duration in a TTY character. In a typical application, the minimum tone duration is 22 ms (for the start tone and character tones) so the packet length is selected to be no more than 11 ms. In other words, the packet payload will include no more than 11 ms of TTY tones. In this manner, the likelihood of an entire TTY character tone being lost is reduced significantly compared to longer packet lengths. Even if two adjacent packets are lost, there is still a likelihood that the tones contained in the lost packets can be reconstructed from the adjacent received packets.

In a further alternative embodiment, the TTY packet reconstruction agent is implemented as a logic circuit, such as ASIC, or as a combination of software and hardware.

In yet a further alternative embodiment, the TTY packet reconstruction agent or a portion thereof can be located in the TTD device.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process for error correction in a packetized TTY stream, comprising:
   receiving a first plurality of packets, each comprising audio information corresponding to at least a portion of one or more TTY tones in at least one sequence of TTY tones;
   ordering the packets based on sequence numbers in the packets;
   depacketizing the at least a portion of one or more TTY tones in the ordered first plurality of packets to yield an ordered at least one sequence of TTY tones;
   determining when at least a portion of a TTY tone is missing from the ordered at least one sequence of TTY tones, wherein a gap in the ordered at least one sequence of TTY tones is assumed to represent a missing at least a portion of a TTY tone;
   when at least a portion of a TTY tone is missing, reconstructing the missing at least a portion of a TTY tone to form a reconstructed at least one sequence of TTY tones;
   thereafter repacketizing the reconstructed at least one sequence of TTY tones to form a second plurality of packets; and
   transmitting the second plurality of packets to a next node.

2. The method of claim 1, wherein the steps are performed by at least one of a gateway, a router, a proxy server, originating device, terminating device, a PBX system, a central office switch, and a device systems that translates automatically between TTY and voice or between TTY and other text protocols, such as "Instant Messaging."

3. The method of claim 1, wherein the first plurality of packets is part of a Voice-Over-Internet Protocol communication.

4. The method of claim 1, wherein the at least one sequence of TTY tones comprise start tones, stop tones, and TTY character tones.

5. The method of claim 1, wherein the depacketizing step comprises:
   partitioning the audio information in the first plurality of packets into at least one TTY character defined by the ordered at least one sequence of TTY tones.

6. The method of claim 5, wherein the partitioning step comprises:
   determining a plurality of tone borders between adjacent TTY tones in the at least one sequence of TTY tones.

7. The method of claim 1, wherein the reconstructing step comprises:
   (a) determining the at least a portion of a TTY tone based on at least a portion of a tone in one or more adjacent packets.

8. The method of claim 7, wherein the reconstructing step comprises:
   (b) when the at least a portion of a TTY tone cannot be determined based on at least a portion of a tone in one or more adjacent packets, determining the at least a portion of a TTY tone based on a random or pseudo-random tone selection.

9. The method of claim 8, wherein the reconstructing step comprises:
   (c) determining whether the at least a portion of a TTY tone corresponds to a letter or number;
   when the at least a portion of a TTY tone corresponds to a letter, performing determining step (b); and
   when the at least a portion of a TTY tone corresponds to a number, not performing step (b).

10. The method of claim 7, wherein the reconstructing step comprises:
    (b) when the at least a portion of a TTY tone cannot be determined based on at least a portion of a tone in one or more adjacent packets, determining a first TTY character using a first tone having a first frequency for the missing at least a portion of a TTY tone and a second TTY character using a second tone having a second frequency for the missing at least a portion of a TTY tone, wherein the first and second frequencies are different;

(c) comparing a first sequence of TTY characters incorporating the first TTY character with a library of TTY character sequences;

(d) comparing a second sequence of TTY characters incorporating the second TTY character with the library of TTY character sequences; and (e) selecting the first TTY character when a match exists in step (c) and the second TTY character when a match exists in step (d).

11. The method of claim 10, wherein the reconstructing step comprises:

(f) determining whether the at least a portion of a TTY tone corresponds to a letter or number;

when the at least a portion of a TTY tone corresponds to a letter, performing steps (b) through (e); and when the at least a portion of a TTY tone corresponds to a number, not performing steps (b) through (e).

12. The method of claim 7, wherein the reconstructing step comprises:

(b) when the at least a portion of a TTY tone cannot be determined based on at least a portion of a tone in one or more adjacent packets, determining a first TTY character using a first tone having a first frequency for the missing at least a portion of a TTY tone and a second TTY character using a second tone having a second frequency for the missing at least a portion of a TTY tone, wherein the first and second frequencies are different;

(c) determining a first probability associated with the first TTY character;

(d) determining a second probability associated with the second TTY character; and (e) selecting between the first and second TTY characters based upon the first and second probabilities.

13. The method of claim 12, wherein the reconstructing step comprises:

(f) determining whether the at least a portion of a TTY tone corresponds to a letter or number;

when the at least a portion of a TTY tone corresponds to a letter, performing steps (b) through (e); and when the at least a portion of a TTY tone corresponds to a number, not performing steps (b) through (e).

14. The method of claim 1, wherein, when the at least a portion of a TTY tone cannot be determined based on at least a portion of a tone in one or more adjacent packets, inserting an unknown identifier for the TTY character containing the at least a portion of a TTY tone.

15. The method of claim 1, wherein the at least one sequence of TTY tones has a minimum and a maximum tone duration, wherein each of the packets in the first plurality of packets has an associated tone duration in a respective packet payload, and wherein the associated tone duration is greater than one-half of the minimum tone duration.

16. The method of claim 13, wherein the minimum tone duration is 22 ms and the maximum tone duration is one of 33 and 44 ms, and the associated tone duration is one of 20 ms and 30 ms.

17. A process comprising:

receiving a plurality of first packets, each comprising audio information corresponding to at least a portion of one or more TTY tones in at least one sequence of TTY tones and each packet containing one of 10 ms, 20 ms, and 30 ms of one or more TTY tones;

ordering the packets to form an ordered set of first packets;

depacketizing the at least a portion of one or more TTY tones in the order set of first packets to yield an ordered at least one sequence of TTY tones;

determining when at least a portion of a TTY tone is missing from the ordered at least one sequence of TTY tones, wherein a gap in the ordered at least one sequence of TTY tones represents a missing at least a portion of a TTY tone; and when at least a portion of a TTY tone is missing, reconstructing the missing at least a portion of a TTY tone to form a reconstructed at least one sequence of TTY tones.

18. The method of claim 17, wherein the steps are performed by at least one of a gateway, a router, a proxy server, originating device, terminating device, a PBX system, a central office switch, and a device systems that translates automatically between TTY and voice or between TTY and other text protocols, such as "Instant Messaging", and wherein a start of the audio information in at least most of the first packets is asynchronous with respect to a start of a contained TTY tone.

19. The method of claim 17, wherein the plurality of first packets is part of a Voice-Over-Internet Protocol communication.

20. The method of claim 17, wherein the TTY tones comprise start tones, stop tones, and TTY character tones.

21. The method of claim 17, wherein the ordering step is based on sequence numbers in the first plurality of packets.

22. The method of claim 17, wherein the depacketizing step comprises:

forming a plurality of tone slots corresponding to at least one TTY character for receiving the audio information; and copying the audio information into a corresponding slot in the plurality of tone slots.

23. The method of claim 22, wherein the forming step comprises:

determining a plurality of tone borders between adjacent TTY tones in the ordered at least one sequence of TTY tones.

24. The method of claim 17, wherein the reconstructing step comprises:

(a) determining the at least a portion of a TTY tone based on at least a portion of a tone in one or more adjacent packets.

25. The method of claim 24, wherein the reconstructing step comprises:

(b) when the at least a portion of a TTY tone cannot be determined based on at least a portion of a tone in one or more adjacent packets, determining the at least a portion of a TTY tone based on a random or pseudo-random tone selection.

26. The method of claim 25, wherein the reconstructing step comprises:

(c) determining whether the at least a portion of a TTY tone corresponds to a letter or number;

when the at least a portion of a TTY tone corresponds to a letter, performing determining step (b); and when the at least a portion of a TTY tone corresponds to a number, not performing step (b).

27. The method of claim 24, wherein the reconstructing step comprises:

(b) when the at least a portion of a TTY tone cannot be determined based on at least a portion of a tone in one or more adjacent packets, determining a first TTY character using a first tone for the missing at least a portion of a TTY tone and a second TTY character using a second tone for the missing at least a portion of a TTY tone;

(c) comparing a first sequence of TTY characters incorporating the first TTY character with a library of TTY character sequences;

(d) comparing a second sequence of TTY characters incorporating the second TTY character with the library of TTY character sequences; and (e) selecting the first TTY character when a match exists in step (c) and the second TTY character when a match exists in step (d).

28. The method of claim 27, wherein the reconstructing step comprises:

(f) determining whether the at least a portion of a TTY tone corresponds to a letter or number;

when the at least a portion of a TTY tone corresponds to a letter, performing steps (b) through (e); and when the at least a portion of a TTY tone corresponds to a number, not performing steps (b) through (e).

29. The method of claim 24, wherein the reconstructing step comprises:

(b) when the at least a portion of a TTY tone cannot be determined based on at least a portion of a tone in one or more adjacent packets, determining a first TTY character using a first tone having a first frequency for the missing at least a portion of a TTY tone and a second TTY character using a second tone having a second frequency for the missing at least a portion of a TTY tone, wherein the first and second frequencies are different;

(c) determining a first probability associated with the first TTY character;

(d) determining a second probability associated with the second TTY character; and (e) selecting between the first and second TTY characters based upon the first and second probabilities.

30. The method of claim 29, wherein the reconstructing step comprises:

(f) determining whether the ordered at least a portion of a TTY tone corresponds to a letter or number;

when the at least a portion of a TTY tone corresponds to a letter, performing steps (b) through (e); and when the at least a portion of a TTY tone corresponds to a number, not performing steps (b) through (e).

31. The method of claim 17, wherein, when the at least a portion of a TTY tone cannot be determined based on at least a portion of a tone in one or more adjacent packets, inserting an unknown identifier for the TTY character containing the at least a portion of a TTY tone.

32. A process for error correction in a packetized TTY stream, comprising:

(a) receiving a plurality of first packets, each comprising audio information corresponding to at least a portion of one or more TTY tones in at least one sequence of TTY tones;

(b) ordering the packets to form an ordered set of first packets;

(c) depacketizing the audio information in the ordered set of first packets to yield an ordered at least one sequence of TTY tones;

(d) determining when at least a portion of a TTY tone is missing from the ordered at least one sequence of TTY tones, wherein a gap in the ordered at least one sequence of TTY tones is assumed to represent a missing at least a portion of a TTY tone; and (e) when at least a portion of a TTY tone is missing, performing at least one of the following steps:

(1) determining the at least a portion of a TTY tone based on at least a portion of the tone contained in an adjacent packet; and (2) determining the at least a portion of a TTY tone based on at least one of: (i) a random or pseudo-random tone selection, (ii) a comparison of a first probability associated with a first TTY character generated from a first tone having a first frequency, the first tone being substituted for the missing at least a portion of a TTY tone, with a second probability associated with a second TTY character generated from a second tone having a second different frequency, the second tone being substituted for the missing at least a portion of a TTY tone, and (iii) comparison of a first ordering of TTY characters comprising the first TTY character and a second ordering of TTY characters comprising the second TTY character with a library of TTY character orderings.

33. The method of claim 32, wherein the steps are performed by at least one of a gateway, a router, a proxy server, originating device, terminating device, a PBX system, a central office switch, and a device systems that translates automatically between TTY and voice or between TTY and other text protocols, such as "Instant Messaging."

34. The method of claim 32, wherein the plurality of first packets is part of a Voice-Over-Internet Protocol communication.

35. The method of claim 32, wherein the TTY tones comprise start tones, stop tones, and TTY character tones.

36. The method of claim 32, wherein the ordering step is based on sequence numbers in the first plurality of packets.

37. The method of claim 32, wherein the depacketizing step comprises:

forming a plurality of tone slots corresponding to at least one TTY character for receiving the audio information; and copying the audio information into a corresponding slot in the plurality of tone slots.

38. The method of claim 37, wherein the forming step comprises:

determining a plurality of tone borders between adjacent TTY tones in the ordered at least one sequence of TTY tones.

39. The method of claim 32, wherein the step of determining the at least a portion of a TTY tone based on a random or pseudo-random tone selection is performed.

40. The method of claim 32, further comprising:

(c) determining whether the at least a portion of a TTY tone corresponds to a letter or number;

when the at least a portion of a TTY tone corresponds to a letter, performing determining step (f); and when the at least a portion of a TTY tone corresponds to a number, not performing step (f).

41. The method of claim 32, wherein the step of comparing the first ordering of TTY characters and second orderings of TTY characters with a library of TTY character orderings is performed.

42. The method of claim 32, wherein the step of selecting between the first and second TTY characters based upon the first and second probabilities is performed.

43. The method of claim 32, wherein, when the at least a portion of a TTY tone cannot be determined based on at least a portion of the tone in an adjacent packet, inserting an unknown identifier for the TTY character containing the at least a portion of a TTY tone.

44. The method of claim 32, further comprising:
  (f) determining whether the missing at least a portion of a TTY tone corresponds to at least one complete TTY tone; and
  (g) when the missing at least a portion of a TTY tone corresponds to at least one complete TTY tone, performing substep (2) with respect to the missing at least one complete TTY tone; and
  (h) when the missing at least a portion of a TTY tone corresponds to only a portion of a TTY tone, performing substep (1) with respect to the missing portion of the TTY tone.

45. The method of claim 44, further comprising:
  (i) determining whether a gap in the ordered at least one sequence of TTY tones, the gap comprising the missing at least a portion of a TTY tone, is less than 22 milliseconds in duration;
  (j) when the gap is less than 22 milliseconds in duration, performing substep (1); and
  (k) when the gap is not less than 22 milliseconds in duration, performing determining step (f).

46. A system for error correction in a packetized TTY stream, comprising:
  (a) an input operable to receive a plurality of first packets, each comprising audio information corresponding to at least a portion of one or more TTY tones in least one sequence of TTY tones; and
  (b) a processor operable to:
    (i) order the first packets to form an ordered set of first packets;
    (ii) depacketize the audio information in the ordered set of first packets;
    (iii) determine when at least a portion of a TTY tone is missing from an ordered at least one sequence of TTY tones; and
    (iv) when at least a portion of a TTY tone is missing, perform at least one of the following steps:
      (1) determine the at least a portion of a TTY tone based on at least a portion of the tone contained in an adjacent packet; and
      (2) determine the at least a portion of a TTY tone based on at least one of (i) a random or pseudo-random tone selection, (ii) a comparison of a first probability associated with a first TTY character generated from a first tone of a first frequency, the first tone being substituted for the missing at least a portion of a TTY tone, with a second probability associated with a second TTY character generated from a second tone of a second different frequency, the second tone being substituted for the missing at least a portion of a TTY tone, and (iii) a comparison of a first ordering of TTY characters comprising the first TTY character and a second ordering of TTY characters comprising the second TTY character with a library of TTY character orderings.

47. The system of claim 46, wherein the processor is part of at least one of a gateway, a router, a proxy server, originating device, terminating device, a PBX system, a central office switch, and a device systems that translates automatically between TTY and voice or between TTY and other text protocols, such as "Instant Messaging."

48. The system of claim 46, wherein the plurality of first packets is part of a Voice-Over-Internet Protocol communication.

49. The system of claim 46, wherein the TTY tones comprise start tones, stop tones, and TTY character tones.

50. The system of claim 46, wherein the ordering step is based on sequence numbers in the first plurality of packets.

51. The system of claim 46, wherein the processor performs the function of determining the at least a portion of a TTY tone based on a random or pseudo-random tone selection is performed.

52. The system of claim 46, wherein the processor is further operable to (v) determine whether the at least a portion of a TTY tone corresponds to a letter or number; (vi) when the at least a portion of a TTY tone corresponds to a letter, perform function (iv); and (vii) when the at least a portion of a TTY tone corresponds to a number, not perform function (iv).

53. The system of claim 46, wherein the function of comparing the first ordering of TTY characters and second orderings of TTY characters with a library of TTY character orderings is performed.

54. The system of claim 46, wherein the function of selecting between the first and second TTY characters based upon the first and second probabilities is performed.

55. The system of claim 46, wherein the processor is operable, when the at least a portion of a TTY tone cannot be determined based on at least a portion of a tone in one or more adjacent packets, to (v) insert an unknown identifier for the TTY character containing the at least a portion of a TTY tone.

56. The system of claim 46, wherein the processor is further operable to:
  (v) determine whether the missing at least a portion of a TTY tone corresponds to at least one complete TTY tone; and
  (vi) when the missing at least a portion of a TTY tone corresponds to at least one complete TTY tone, perform function (2) with respect to the missing at least one complete TTY tone; and
  (vii) when the missing at least a portion of a TTY tone corresponds to only a portion of a TTY tone, perform function (1) with respect to the missing portion of the TTY tone.

57. The system of claim 56, wherein the processor is further operable to:
  (viii) determine whether a gap in the ordered at least one sequence of TTY tones, the gap comprising the missing at least a portion of a TTY tone, is less than 22 milliseconds in duration;
  (ix) when the gap is less than 22 milliseconds in duration, perform function (1); and
  (x) when the gap is not less than 22 milliseconds in duration, perform determining function (v).

58. A process comprising;
  (a) receiving a plurality of first packets, each comprising at least portions of one or more TTY tones;
  (b) ordering the packets to form an ordered set of first packets;
  (c) depacketizing the at least portions of one or more TTY tones in each of the ordered set of first packets to form an ordered at least one sequence of TTY tones;
  (d) determining when at least a portion of a TTY tone is missing from the ordered at least one sequence of TTY tones; and
  (e) when the at least a portion of a TTY tone is missing, substituting an unknown identifier for at least one of a TTY character corresponding to the at least one sequence of TTY tones and the missing at least a portion of a TTY tone.

* * * * *